(12) United States Patent
Imanishi (10) Patent No.: US 10,253,825 B2
(45) Date of Patent: *Apr. 9, 2019

(54) CLUTCH DEVICE FOR MOTORCYCLE

(71) Applicant: EXEDY Corporation, Neyagawa-shi, Osaka (JP)

(72) Inventor: Yoshio Imanishi, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,275

(22) Filed: Nov. 16, 2016

(65) Prior Publication Data

US 2017/0159725 A1 Jun. 8, 2017

(30) Foreign Application Priority Data

Dec. 4, 2015 (JP) .................................. 2015-238003

(51) Int. Cl.
*F16D 23/12* (2006.01)
*F16D 13/52* (2006.01)
*F16D 13/56* (2006.01)

(52) U.S. Cl.
CPC ............. *F16D 23/12* (2013.01); *F16D 13/52* (2013.01); *F16D 13/56* (2013.01); *F16D 2013/565* (2013.01); *F16D 2023/123* (2013.01)

(58) Field of Classification Search
CPC .......... F16D 23/12; F16D 13/56; F16D 13/52; F16D 2013/565; F16D 2032/123
See application file for complete search history.

(56) References Cited

U.S. PATENT DOCUMENTS

| | | | | |
|---|---|---|---|---|
| 2,856,048 A | * | 10/1958 | Carlson | F16D 13/56 192/109 A |
| 4,550,817 A | * | 11/1985 | Euler | F16D 13/52 192/70.23 |
| 4,645,049 A | * | 2/1987 | Matsuda | F16D 13/04 192/105 B |
| 2004/0238315 A1 | * | 12/2004 | Drussel | F16D 23/12 192/105 B |
| 2011/0061985 A1 | * | 3/2011 | Nakamura | F16D 13/52 192/70.23 |
| 2015/0377303 A1 | * | 12/2015 | Adachi | F16D 13/54 192/70.27 |
| 2017/0159724 A1 | * | 6/2017 | Imanishi | F16D 13/56 |

FOREIGN PATENT DOCUMENTS

JP 4907642 B2 4/2012

* cited by examiner

*Primary Examiner* — David J Hlavka
(74) *Attorney, Agent, or Firm* — United IP Counselors, LLC (57) ABSTRACT

A clutch center includes a pressure receiving part and is accommodated inside the clutch housing. A pressure plate includes a pressure applying part disposed at an interval from the pressure receiving part in an axial direction. A clutch portion is disposed between the pressure receiving part and the pressure applying part, and allows and blocks transmission of a power between the clutch housing and the pressure plate. A first cam portion is disposed on one side of the pressure plate in the axial direction, and increases an engaging force of the clutch portion when a forward drive force acts on a clutch device. A second cam portion is disposed on the other side of the pressure plate in the axial direction, and reduces the engaging force of the clutch portion when a reverse drive force acts on the clutch device.

10 Claims, 6 Drawing Sheets

CLUTCH DEVICE FOR MOTORCYCLE

CROSS-REFERENCE TO RELATED APPLICATIONS

This application claims priority to Japanese Patent Application No. 2015-238003 filed on Dec. 4, 2015, the entirety of which is hereby incorporated by reference in its entirety.

BACKGROUND

Technical Field

The present disclosure relates to a clutch device for a motorcycle.

Background Information

In general, motorcycles (a two-wheeled motorcycle, a buggy, etc.) use a clutch device for allowing or blocking transmission of power from an engine to a transmission. The clutch device includes a clutch housing, a clutch center, a clutch portion and a pressure plate. The clutch housing is coupled to an engine crankshaft side. The clutch center is coupled to a transmission side. The clutch portion is disposed between the clutch housing and the clutch center and is configured to allow and block transmission of power. The pressure plate is configured to press the clutch portion.

A clutch device described in Publication of Japan Patent No. 4907642 has been proposed as this type of clutch device. The clutch device includes a cam mechanism disposed between the clutch center and the pressure plate. When a forward drive force acts on the cam mechanism from a driven gear, the cam mechanism is configured to increase the magnitude of clutch engaging force. On the other hand, when a reverse drive force acts on the cam mechanism from a main shaft, the cam mechanism is configured to reduce the magnitude of clutch engaging force.

In the clutch device described in Publication of Japan Patent No. 4907642, the cam mechanism includes a first cam member and a second cam member. The first cam member is herein fixed to the clutch center and includes protruded cams. On the other hand, the second cam member is fixed to the pressure plate, and includes recessed cams into which the protruded cams of the first cam member are respectively inserted.

Now in the clutch device described in Publication of Japan Patent No. 4907642, the first and second cam members, composing the cam mechanism, are provided separately from the clutch center and the pressure plate. To reduce the number of components and to lower manufacturing cost, it is assumed to provide the clutch center and the pressure plate integrally with these cam members. However, each of the protruded cams of the first cam member is required to be provided with first and second contact surfaces that tilt in parallel to each other with respect to a circumferential direction. Hence, when the first cam member is formed integrally with either the clutch center or the pressure plate to be formed by die casting, holes are possibly produced in root parts of the protruded cams due to a pull direction of a die.

Figure 1:
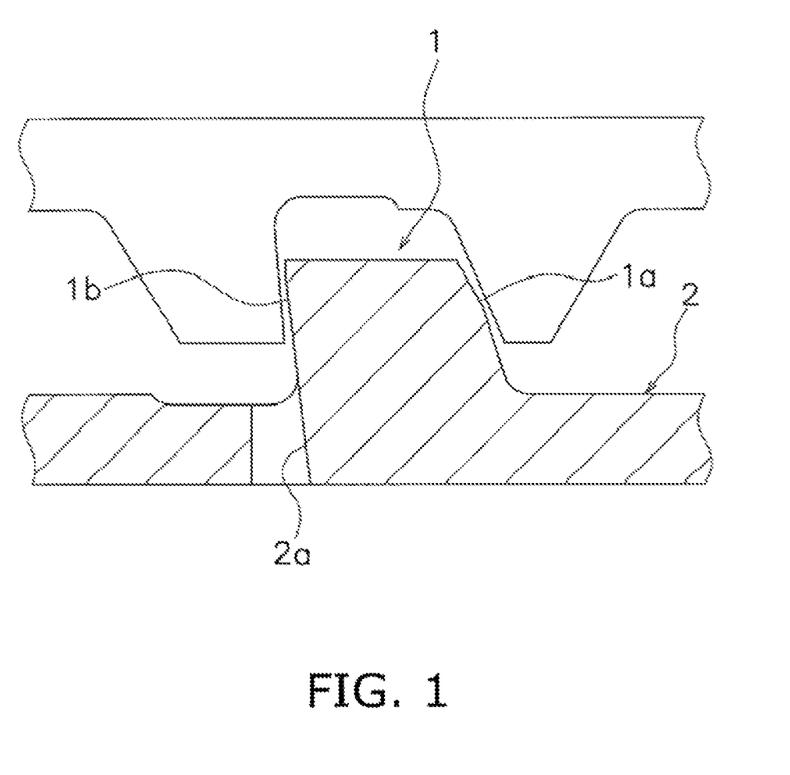
FIG. 1 is a schematic diagram for explaining an object to be achieved by the present disclosure.

FIG. 1 schematically shows the aforementioned situation. In FIG. 1, a clutch center or a pressure plate 2 is integrally provided with protruded cams 1 composing the first cam member. As described above, each of the protruded cams 1 is required to be provided with first and second contact surfaces 1a and 1b that tilt in parallel to each other with respect to the circumferential direction. In general, either the clutch center or the pressure plate 2 is formed by die casting. Therefore, in forming the protruded cams 1 on either the clutch center or the pressure plate 2, use of a first die is required to form the first contact surfaces 1a of the protruded cams 1, whereas use of a second die is required to form the second contact surfaces 1b of the protruded cams 1. Additionally, in order to pull the second die, formation of holes 2a is required in part of the clutch center or part of the pressure plate 2 (i.e., the root parts of the second contact surfaces 1b of the protruded cams 1).

However, either the clutch center or the pressure plate 2, when partially provided with holes, degrades in stiffness due to its construction as an annular member. Therefore, it is required to take a countermeasure such as increase in thickness of the other part of either the clutch center or the pressure plate 2. This results in a drawback of increase in weight of either the clutch center or the pressure plate 2.

SUMMARY

It is an object of the present disclosure to achieve reduction in number of components without degrading stiffness of either a clutch center or a pressure plate in a clutch device for a motorcycle, which includes a cam mechanism configured to achieve increase in clutch engaging force when a forward drive force acts thereon and to achieve reduction in clutch engaging force when a reverse drive force acts thereon.

(1) A clutch device for a motorcycle according to the present disclosure includes a clutch housing, a clutch center, a pressure plate, a clutch portion, a first cam portion and a second cam portion. The clutch center includes a pressure receiving part and is accommodated inside the clutch housing. The pressure plate includes a pressure applying part that is disposed at an interval from the pressure receiving part in an axial direction. The clutch portion is disposed between the pressure receiving part and the pressure applying part and is configured to allow and block transmission of a power between the clutch housing and the pressure plate. The first cam portion is disposed on one side of the pressure plate in the axial direction, and is configured to increase an engaging force of the clutch portion when a forward drive force acts on the clutch device. The second cam portion is disposed on the other side of the pressure plate in the axial direction, and is configured to reduce the engaging force of the clutch portion when a reverse drive force acts on the clutch device.

In this device, a torque inputted into the clutch housing is transmitted to the clutch center and the pressure plate through the clutch portion, and is outputted therefrom. At this time, i.e., when a forward drive force acts on the clutch center and the pressure plate, the engaging force of the clutch portion is configured to be increased by the action of the first cam portion. On the other hand, when a reverse drive force acts on the clutch center from the output side, a reverse torque is configured to be transmitted therefrom through the second cam portion to the pressure plate. In this case, the engaging force of the clutch portion is configured to be reduced by the action of the second cam portion.

Here, the first and second cam portions are disposed in different positions while the pressure plate is interposed therebetween. With this construction, even when each of the first and second cam portions is made in the form of a slope and is integrated with a member (the pressure plate, the clutch center, etc.), the member (the pressure plate, the clutch center, etc.) can be formed with a single die. Therefore, each member (the pressure plate, the clutch center, etc.)

can be formed in the shape of a continuous ring without holes, and degradation in stiffness of each member can be avoided.

(2) The first cam portion may include the pressure plate and a first member that is disposed on a first side of the pressure plate in the axial direction in opposition to the pressure plate and is configured to be rotatable relatively to the pressure plate. On the other hand, the second cam portion may include the pressure plate and a second member that is disposed on a second side of the pressure plate in the axial direction in opposition to the pressure plate and is configured to be rotatable relatively to the pressure plate. Moreover, the first member and the second member may be separately provided.

(3) The first member and the second member may be fixed so as to be non-rotatable relatively to each other and be immovable relatively to each other in the axial direction.

(4) The clutch center may be disposed between the clutch housing and the pressure plate in the axial direction. Additionally, the clutch device may further include a support member. The support member is disposed in opposition to the clutch housing while the clutch center and the pressure plate are interposed between the support member and the clutch housing. Also, the support member is fixed to the clutch center. Moreover, the first cam portion may be provided between the pressure plate and the support member. On the other hand, the second cam portion may be provided between the pressure plate and the clutch center.

(5) The first cam portion may be configured to move the pressure plate in the axial direction such that the pressure applying part of the pressure plate approaches to the pressure receiving part of the clutch center when the pressure plate is rotated relatively to the clutch center in a first rotational direction. On the other hand, the second cam portion may be configured to move the pressure plate in the axial direction such that the pressure applying part of the pressure plate separates from the pressure receiving part of the clutch center when the pressure plate is rotated relatively to the clutch center in a second rotational direction.

(6) The support member may be provided with a first protrusion. The first protrusion is integrated with the support member and protrudes toward the pressure plate. Additionally, the first cam portion may include a first cam surface. The first cam surface is provided on an end surface of the first protrusion in a circumferential direction, and tilts with respect to the circumferential direction.

(7) The first cam portion may include a first slope. The first slope is provided on the pressure plate. The first slope tilts in parallel to the first cam surface with respect to the circumferential direction and makes contact with the first cam surface.

(8) The clutch center may be provided with a second protrusion. The second protrusion is integrated with the clutch center and protrudes toward the pressure plate. Additionally, the second cam portion may include a second cam surface. The second cam surface is provided on an end surface of the second protrusion in the circumferential direction and tilts with respect to the circumferential direction.

(9) The second cam portion may include a second slope. The second slope is provided on the pressure plate. The second slope tilts in parallel to the second cam surface with respect to the circumferential direction and makes contact with the second cam surface.

(10) The first protrusion may be exposed at an outer peripheral surface thereof through an outer peripheral surface of the first slope of the pressure plate to a further outer peripheral side than the outer peripheral surface of the first slope of the pressure plate. Additionally, the clutch center may make contact at an inner peripheral surface thereof with the outer peripheral surface of the first protrusion. Moreover, the first protrusion may protrude toward the clutch center while making contact at the outer peripheral surface thereof with the inner peripheral surface of the clutch center so as to enable positioning of the support member in a radial direction.

Here, radial positioning of the support member is enabled by utilizing the first protrusion composing the first cam portion. Therefore, positioning of a constituent member is easily enabled with a simple construction.

Overall, according to the present disclosure as described above, reduction in number of components can be achieved without degrading stiffness of a clutch center or a pressure plate in a clutch device for a motorcycle, which includes a cam mechanism configured to increase or reduce a clutch engaging force.

BRIEF DESCRIPTION OF THE DRAWINGS

Referring now to the attached drawings which form a part of this original disclosure.

DETAILED DESCRIPTION OF EMBODIMENTS

Entire Construction

Figure 2:
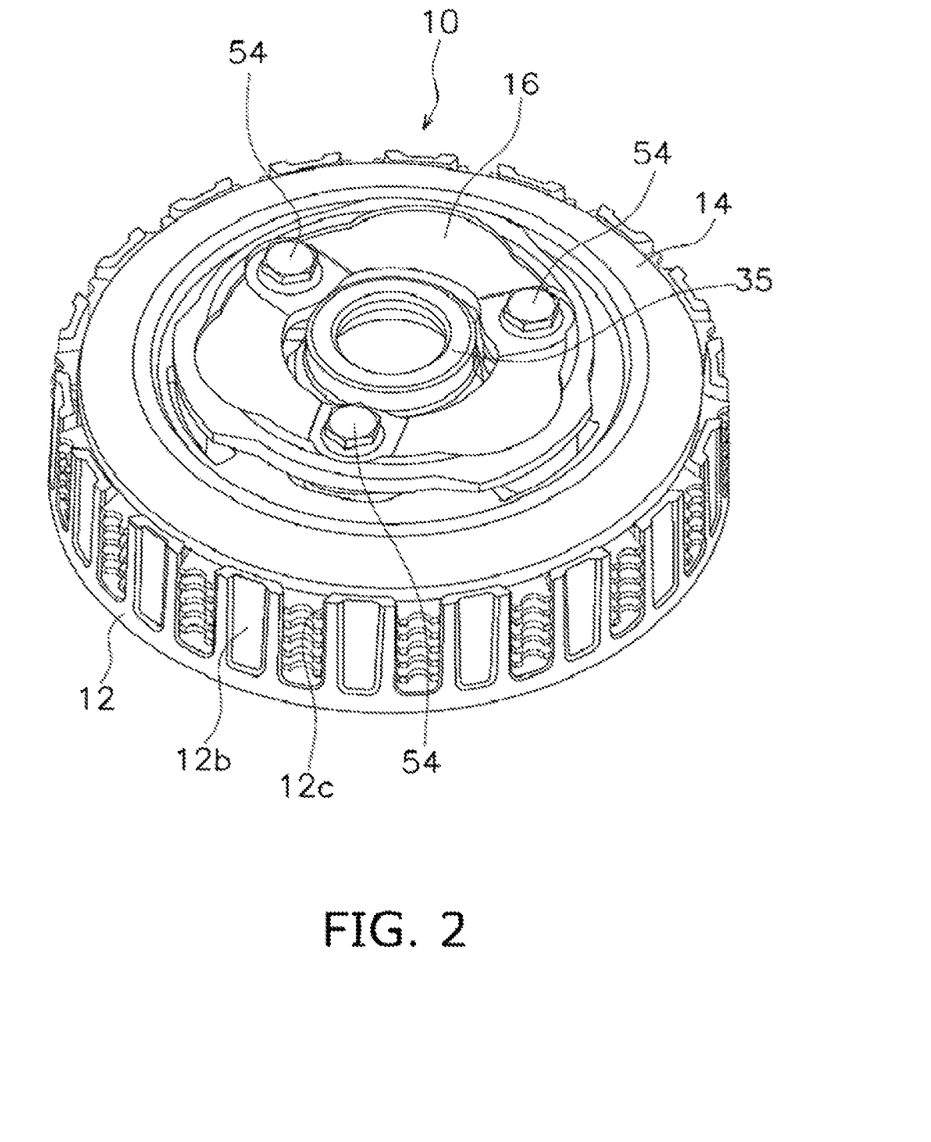
FIG. 2 is an external perspective view of a clutch device according to a preferred embodiment of the present disclosure.
Figure 3:
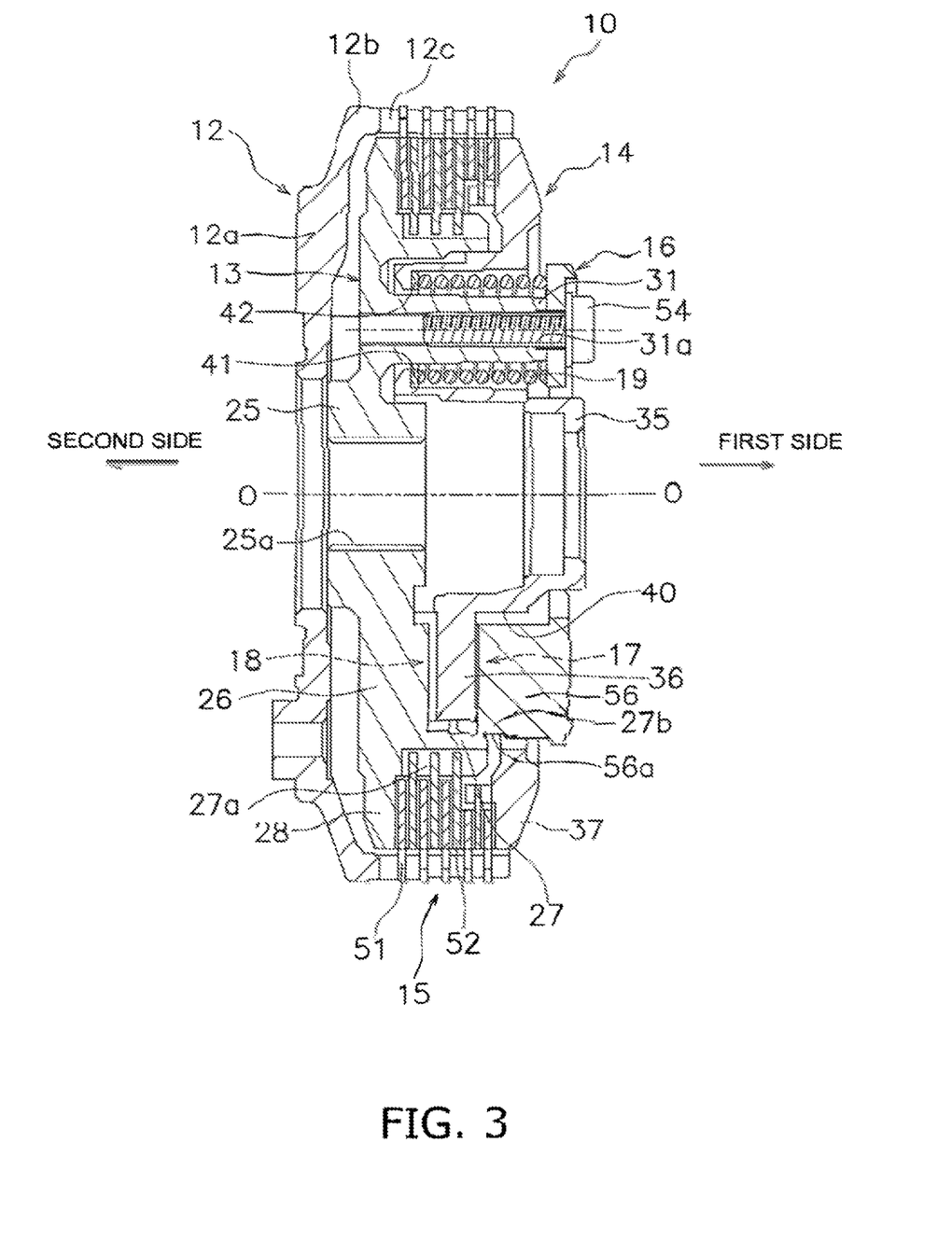
FIG. 3 is a cross-sectional view of the clutch device.
Figure 4:
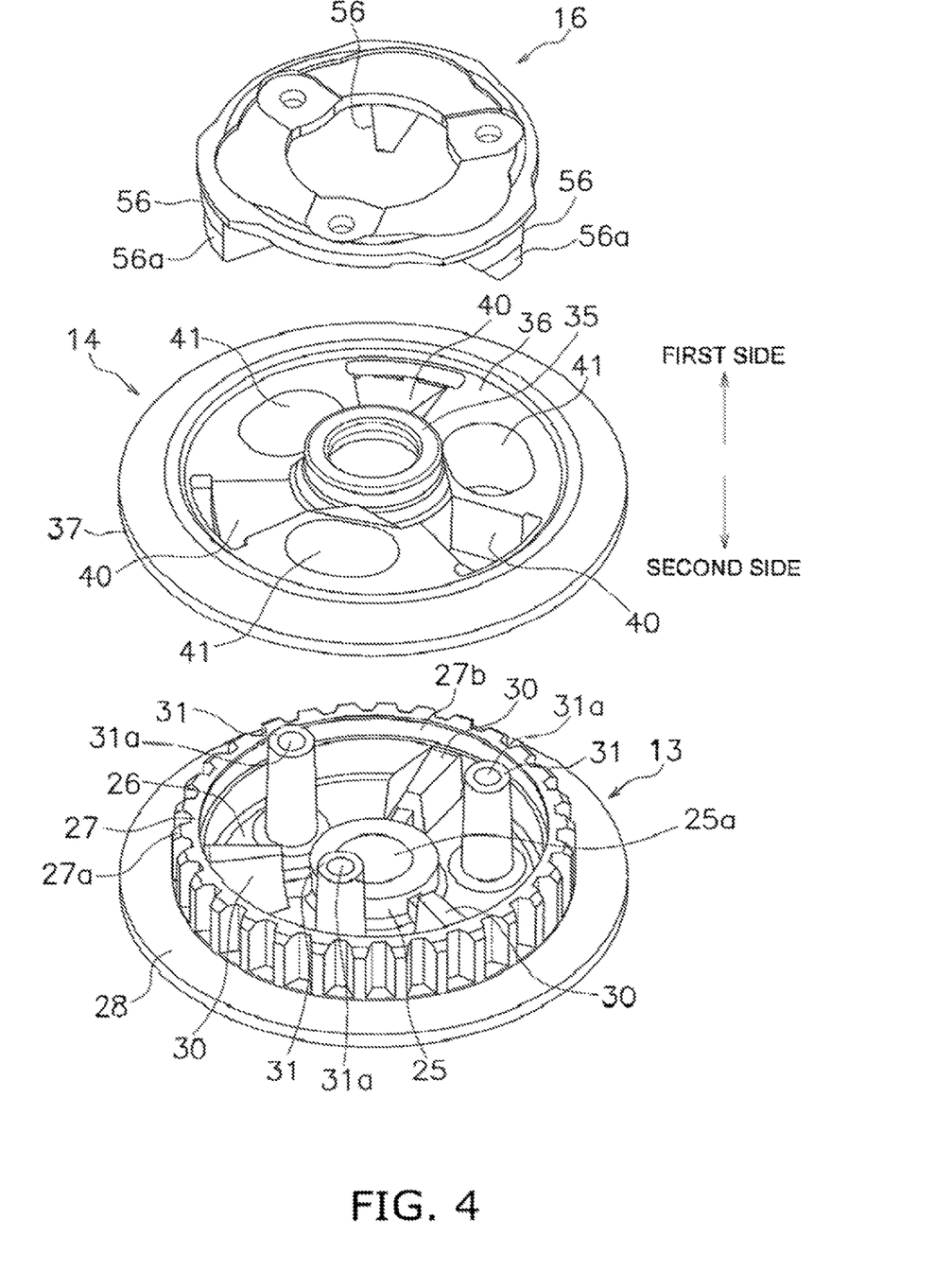
FIG. 4 is an exploded perspective view of major members composing the clutch device.
Figure 5:
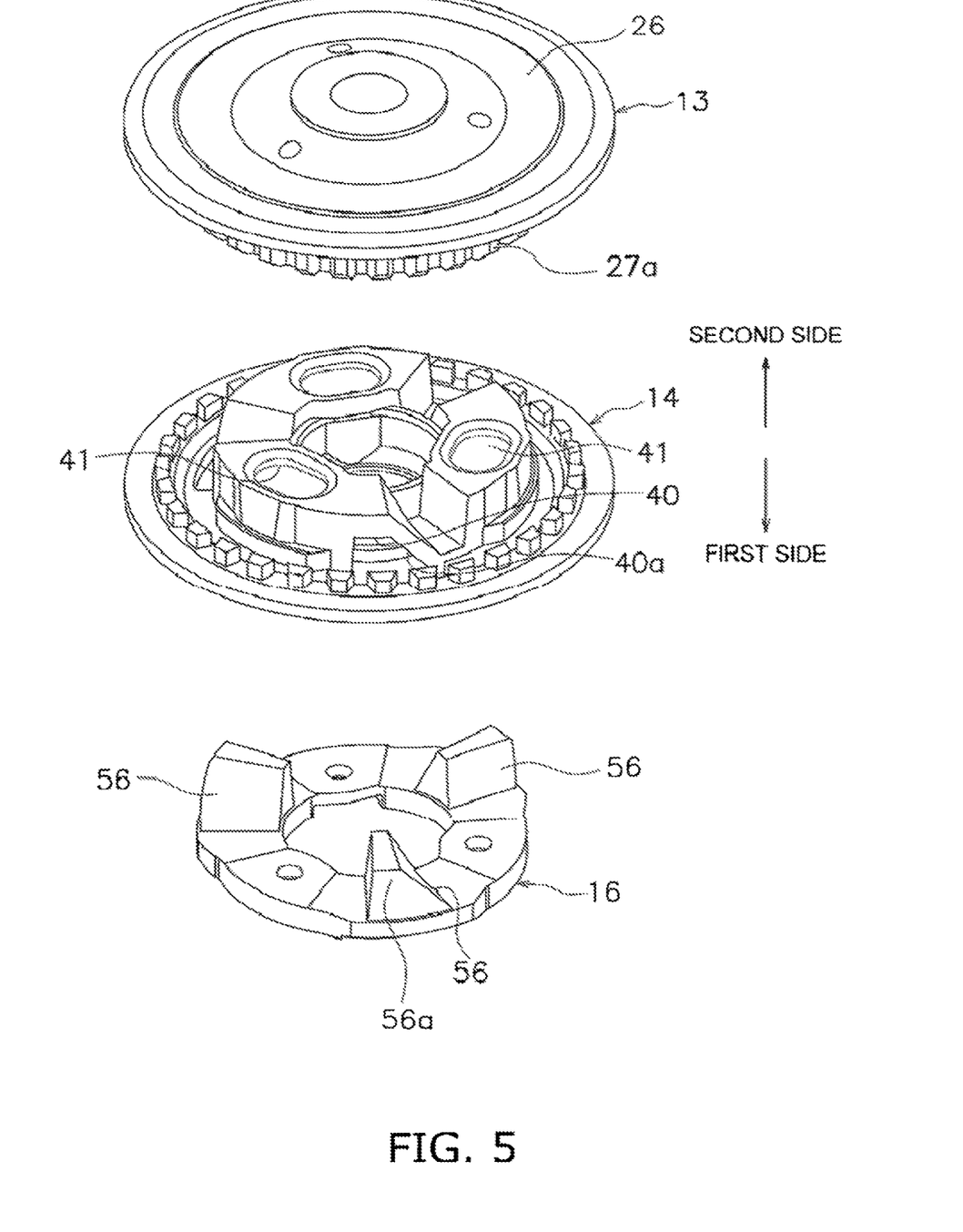
FIG. 5 is an exploded perspective view of the major members composing the clutch device.
Figure 6:
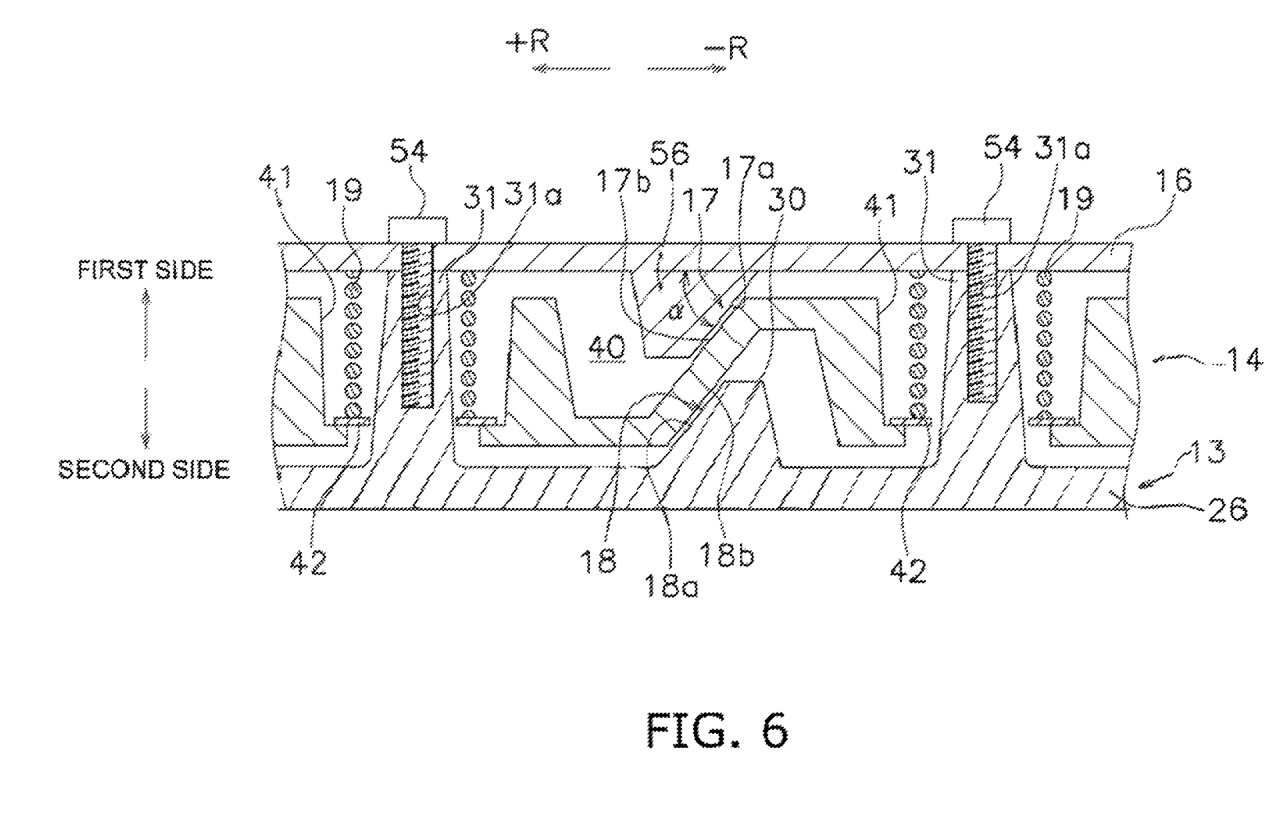
FIG. 6 is a schematic diagram for explaining constructions and actions of cam portions.

FIGS. 2 to 5 show a clutch device 10 for a motorcycle according to a preferred embodiment of the present disclosure. FIG. 2 is an external view of the clutch device 10, whereas FIG. 3 is a cross-sectional view of the clutch device 10. On the other hand, FIGS. 4 and 5 are exploded perspective views of major members. FIG. 2 is shown without illustration of some members (e.g., input-side gear). In the cross-sectional view of FIG. 3, line O-O indicates a rotational axis. On the other hand, FIG. 6 schematically shows a first cam portion and a second cam portion. FIG. 6 is a planar net. It should be noted that in the following explanation, the term "axial direction" refers to an extending direction of the rotational axis O-O. As shown in FIG. 3, the right side in FIG. 3 is defined as "a first side in the axial direction" whereas the left side in FIG. 3 is defined as "a second side in the axial direction".

The clutch device 10 is configured to allow or block transmission of power from an engine to a transmission. The clutch device 10 includes a clutch housing 12, a clutch center 13, a pressure plate 14, a clutch portion 15, a support plate 16, a first cam portion 17 and a second cam portion 18. Additionally, the clutch device 10 further includes a plurality of coil springs 19.

Clutch Housing 12

As shown in FIG. 3, the clutch housing 12 includes a disc part 12a and a tubular part 12b, and is coupled to an input gear (not shown in the drawings). The input gear is meshed with a drive gear (not shown in the drawings) fixed to an engine-side crankshaft.

The input gear is coupled to the disc part 12a through a plurality of coil springs (not shown in the drawings). The plural coil springs are provided for absorbing vibration from the engine, and are inserted into holes provided in the input gear.

The tubular part 12b is provided to extend from the outer peripheral edge of the disc part 12a to the first side in the axial direction. The tubular part 12b is provided with a plurality of cutouts 12c extending in the axial direction. The plural cutouts 12c are aligned at predetermined intervals in the circumferential direction.

Clutch Center 13

The clutch center 13 is disposed in the interior of the clutch housing 12, i.e., on the inner peripheral side of the tubular part 12b of the clutch housing 12. The clutch center 13 has an approximately disc shape and includes a boss part 25 provided on its middle part, a disc part 26, a tubular part 27 and a pressure receiving part 28.

The boss part 25 extends to protrude to the first side in the axial direction. The boss part 2 is provided with a spline hole 25a in its middle part. The spline hole 25a extends in the axial direction. An input shaft (not shown in the drawings) of the transmission is engaged with the spline hole 25a. It should be noted that the clutch center 13 is configured not to be moved in the axial direction.

The disc part 26 is provided to extend radially outward from the boss part 25. As shown in FIGS. 4 and 6, the disc part 26 is provided with three second cam protrusions 30 and three fixation protrusions 31.

The second cam protrusions 30 are provided on a radially intermediate region of the disc part 26, while being aligned in the circumferential direction. The second cam protrusions 30 are provided to protrude to the first side in the axial direction. On the other hand, each fixation protrusion 31 is provided between adjacent two of the second cam protrusions 30 in the circumferential direction, while protruding to the first side in the axial direction. Each fixation protrusion 31 is provided with a screw hole 31a in its center part. The screw hole 31a extends in the axial direction.

The tubular part 27 is provided to extend from the outer peripheral region of the disc part 26 to the first side in the axial direction. The tubular part 27 is provided with a plurality of teeth 27a for engagement on its outer peripheral surface.

The pressure receiving part 28 is provided on the outer peripheral side of the tubular part 27 and extends radially outward. The pressure receiving part 28 has an annular shape and faces to the first side in the axial direction. The pressure receiving part 28 is opposed to the clutch portion 15.

Pressure Plate 14

The pressure plate 14 is a disc-shaped member and is disposed on the first side of the clutch center 13 in the axial direction. The pressure plate 14 is axially movable with respect to the clutch center 13. The pressure plate 14 includes a boss part 35 provided on its middle part, a disc part 36 and a pressure applying part 37.

The boss part 35 extends to protrude to the first side in the axial direction. The disc part 36 is provided to extend radially outward from the boss part 35. The disc part 36 is provided with three recesses 40 and three holes 41. Each hole 41 is provided between adjacent two of the recesses 40 in the circumferential direction. Each recess 40 is provided to recess to the second side in the axial direction, and is thus produced as an internal space of the pressure plate 14. As shown in FIGS. 3 and 6, washers 42 are provided, each of which is disposed on a surface located on the axial second side within each hole 41 and supports one end of each coil spring 19.

The pressure applying part 37 has an annular shape and is provided as the outer peripheral part of the pressure plate 14. The pressure applying part 37 faces to the second side in the axial direction. Additionally, the pressure applying part 37 is disposed at an interval from the pressure receiving part 28 of the clutch center 13 in the axial direction. The clutch portion 15 is disposed between the pressure applying part 37 and the pressure receiving part 28. In other words, the pressure receiving part 28, the clutch portion 15 and the pressure applying part 37 are sequentially aligned in this order from the second side to the first side in the axial direction.

Clutch Portion 15

As shown in FIG. 3, the clutch portion 15 includes at least one first clutch plate 51 and at least one second clutch plate 52. The first and second clutch plates 51 and 52 are disposed between the pressure receiving part 28 and the pressure applying part 37. Transmission of power is allowed or blocked between the clutch housing 12 and the clutch center 13 through the first and second clutch plates 51 and 52. The both types of clutch plates 51 and 52 have annular shapes and are alternately disposed in the axial direction.

The first clutch plate (or plates) 51 is axially movable with respect to the clutch housing 12, while being non-rotatable relatively thereto. In other words, the first clutch plate (or plates) 51 is configured to be unitarily rotated with the clutch housing 12. When described in detail, each first clutch plate 51 is provided with a plurality of engaging protrusions on its outer peripheral part. The engaging protrusions protrude radially outward therefrom. The engaging protrusions are meshed with the cutouts 12c for engagement that are provided in the tubular part 12b of the clutch housing 12. Friction members are attached to the both surfaces of each first clutch plate 51.

Each second clutch plate 52 is provided with a plurality of engaging protrusions on its inner peripheral end. The engaging protrusions protrude radially inward therefrom. The engaging protrusions are meshed with the teeth 27a for engagement that are provided on the tubular part 27 of the clutch center 13. Therefore, the second clutch plate (or plates) 52 is axially movable with respect to the clutch center 13, while being non-rotatable relatively thereto. In other words, the second clutch plate (or plates) 52 is configured to be unitarily rotated with the clutch center 13.

Support Plate 16

The support plate 16 is a disc-shaped member and is disposed on the first side of the pressure plate 14 in the axial direction. The support plate 16 is disposed on the tip end surfaces of the fixation protrusions 31 of the clutch center 13, and is fixed to the clutch center 13 by bolts 54 screwed into the screw holes 31a of the fixation protrusions 31. The support plate 16 has an approximately disc shape and is provided with an opening in its middle part. The support plate 16 is also provided with three first cam protrusions 56 on its outer peripheral part. The first cam protrusions 56 are provided to protrude to the second side in the axial direction.

It should be noted that one end surface of each coil spring 19 makes contact with a lateral surface of the support plate 16. In other words, each coil spring 19 is disposed between the support plate 16 and each washer 42 disposed on the pressure plate 14, and urges the pressure plate 14 to the second side in the axial direction. When a release mechanism (to be described) is not being actuated, the clutch portion 15 is configured to be in a clutch-on state (a state in which transmission of power is allowed) by this urging force.

First Cam Portion 17 and Second Cam Portion 18

The first cam portion 17 is disposed between the pressure plate 14 and the support plate 16 in the axial direction. The first cam portion 17 is a mechanism configured to increase the engaging force of the clutch portion 15 when a forward drive force (positive-side torque) acts on the clutch center 13 and the pressure plate 14. On the other hand, the second cam portion 18 is disposed between the pressure plate 14 and the clutch center 13 in the axial direction. The second cam portion 18 is a mechanism configured to reduce the engaging force of the clutch portion 15 when a reverse drive force (negative-side torque) acts on the clutch center 13 and the pressure plate 14.

<First Cam Portion 17>

As shown in exploded perspective views of FIGS. 4 and 5 and a schematic view of FIG. 6, the first cam portion 17 includes a plurality of first cam surfaces 17a and a plurality of first slopes 17b.

Each first cam surface 17a is provided on each first cam protrusion 56 of the support plate 16. Each first cam protrusion 56 is provided on the second-side lateral surface of the support plate 16 and protrudes to the second side in the axial direction. Each first cam protrusion 56 is inserted into each recess 40 of the pressure plate 14. Additionally, each first cam protrusion 56 is provided with the first cam surface 17a on one circumferential end surface thereof. Each first cam surface 17a tilts at an angle α with respect to the circumferential direction. It should be noted that the other circumferential end surface of each first cam protrusion 56 tilts oppositely to the tilt direction of the first cam surface 17a with respect to the circumferential direction.

Each first slope 17b is provided on each recess 40 of the pressure plate 14. Specifically, each recess 40 is provided with the first slope 17b on one circumferential end surface thereof. Each first slope 17b tilts in parallel to and at the same angle α as each first cam surface 17a with respect to the circumferential direction. Additionally, each first cam surface 17a is contactable to each first slope 17b.

<Second Cam Portion 18>

As shown in the exploded perspective views of FIGS. 4 and 5 and the schematic view of FIG. 6, the second cam portion 18 includes a plurality of second cam surfaces 18a and a plurality of second slopes 18b.

Each second cam surface 18a is provided on each second cam protrusion 30 of the clutch center 13. Specifically, each second cam protrusion 30 is provided with the second cam surface 18a on one circumferential end surface thereof. Each second cam surface 18a tilts at an angle -α with respect to the circumferential direction. It should be noted that the other circumferential end surface of each second cam protrusion 30 tilts oppositely to the tilt direction of each second cam surface 18a with respect to the circumferential direction.

Each second slope 18b is provided on each recess 40 of the pressure plate 14. Specifically, in each recess 40, the back surface of the wall on which the first slope 17b is provided (i.e., the surface located on the second side in the axial direction) functions as the second slope 18b. Each second slope 18b tilts in parallel to and at the same angle -α as each second cam surface 18a with respect to the circumferential direction. Additionally, each second cam surface 18a is contactable to each second slope 18b.

Positioning Mechanism

As shown in FIG. 5, each of the recesses 40 recessed on the pressure plate 14 is provided with an opening 40a in its outer peripheral surface. Additionally, the outer peripheral surface of each first cam protrusion 56 provided on the support plate 16 is exposed through the opening 40a to the further outer peripheral side than the outer peripheral surface of each recess 40 (first slope). Moreover, each of the three first cam protrusions 56 is provided with a contact surface 56a (see FIGS. 3 to 5) on the outer peripheral surface of its tip. The contact surfaces 56a of the three first cam protrusions 56 are located on a common imaginary circumferential surface.

On the other hand, as shown in FIGS. 3 and 4, the tubular part 27 of the clutch center 13 is provided with a contact surface 27b on its inner peripheral surface. Additionally, the contact surfaces 56a of the first cam protrusions 56 make contact with the contact surface 27b, whereby radial positioning of the support plate 16 is enabled with respect to the clutch center 13.

Actions

When a release operation is not being performed in the clutch device 10, the support plate 16 and the pressure plate 14 are urged oppositely to each other by the coil springs 19. The support plate 16 is fixed to the clutch center 13, and is thus configured not to be moved in the axial direction. Hence, the pressure plate 14 is moved to the second side in the axial direction. As a result, the clutch portion 15 is turned into a clutch-on state.

In this state, a torque from the engine is inputted into the clutch housing 12 through the input gear, and is then transmitted to the clutch center 13 and the pressure plate 14 through the clutch portion 15.

Next, actions of the first and second cam portions 17 and 18 will be explained in detail.

When a forward drive force acts on the clutch center 13 and the pressure plate 14, in other words, when a positive-side torque acts on the clutch center 13 and the pressure plate 14, the support plate 16 fixed to the clutch center 13 also receives a torque equivalent to the positive-side torque. In this case, the first cam portion 17 is actuated. Specifically, when the forward drive force acts on the clutch center 13 and the pressure plate 14, the pressure plate 14 is rotated relatively to the support plate 16 in a +R direction shown in FIG. 6. Accordingly, the first slopes 17b are pressed against the first cam surfaces 17a. The clutch center 13 is herein configured not to be moved in the axial direction. Hence, the support plate 16 is also configured not to be moved in the axial direction. By contrast, the first slopes 17b are moved along the first cam surfaces 17a. Consequently, the pressure plate 14 is moved to the second side in the axial direction. In other words, the pressure applying part 37 of the pressure plate 14 is moved toward the pressure receiving part 28 of the clutch center 13. As a result, the clutch portion 15 is firmly interposed between and held by the pressure applying part 37 and the pressure receiving part 28. This increases the clutch engaging force.

On the other hand, when a rider returns a throttle grip to reduce acceleration, a reverse drive force acts on the clutch device 10 through the clutch center 13. In this case, the second cam portion 18 is actuated. In other words, the clutch center 13 is rotated relatively to the pressure plate 14 in a +R direction shown in FIG. 6 by a torque from the transmission side. From a reverse point of view, the pressure plate 14 is rotated relatively to the clutch center 13 in a -R direction. With this relative rotation, the second cam surfaces 18a and the second slopes 18b are pressed against each other. The clutch center 13 is configured not to be moved in the axial direction. Hence, due to this pressing, the second slopes 18b are moved along the second cam surfaces 18a, and the pressure plate 14 is moved to the first side in the axial direction. As a result, the pressure applying part 37 is moved in a separating direction from the pressure receiving part 28. This reduces the clutch engaging force.

Next, when the rider squeezes a clutch lever, the operating force is transmitted to the release mechanism (not shown in the drawings) through a clutch wire and so forth. The pressure plate 14 is moved by the release mechanism against the urging force of the coil springs 19 to the first side in the axial direction. When the pressure plate 14 is moved to the first side in the axial direction, pressure of the pressure plate 14 onto the clutch portion 15 is released, and the clutch portion 15 is turned into a clutch-off state. In this clutch-off state, rotation from the clutch housing 12 is not transmitted to the clutch center 13.

OTHER PREFERRED EMBODIMENTS

The present disclosure is not limited to the aforementioned preferred embodiment, and a variety of changes or modifications can be made without departing from the scope of the present disclosure.

(a) In the aforementioned preferred embodiment, each of the support plate and the pressure plate is provided with protrusions integrated therewith, and the protrusions compose part of the cam portion. However, at least one of the support plate and the pressure plate may be provided with a separate member fixed thereto, and the separate member may be provided with protrusions.

(b) Positional arrangements of the first cam portion and the second cam portion are not limited to those in the aforementioned preferred embodiment. The positional arrangement of the first cam portion and that of the second cam portion may be reversed.

(c) In the aforementioned preferred embodiment, the coil springs are exemplified as urging members. However, disc springs or so forth may be used instead of the coil springs.

What is claimed is:

1. A clutch device for a motorcycle, comprising:
a clutch housing;
a clutch center including a pressure receiving part, the clutch center accommodated inside the clutch housing;
a pressure plate including a pressure applying part, the pressure applying part disposed at an interval from the pressure receiving part in an axial direction;
a clutch portion disposed between the pressure receiving part and the pressure applying part, the clutch portion configured to allow and block transmission of a power between the clutch housing and the pressure plate;
a first cam portion facing one side of the pressure plate in the axial direction, the first cam portion configured to increase an engaging force of the clutch portion when a forward drive force acts on the clutch device; and
a second cam portion facing an other side of the pressure plate in the axial direction, the second cam portion configured to reduce the engaging force of the clutch portion when a reverse drive force acts on the clutch device.

2. The clutch device according to claim 1, wherein
the first cam portion includes a first member, the first member facing a first side of the pressure plate in the axial direction in opposition to the pressure plate, the first member configured to be rotatable relatively to the pressure plate,
the second cam portion includes a second member, the second member facing a second side of the pressure plate in the axial direction in opposition to the pressure plate, the second member configured to be rotatable relatively to the pressure plate, and
the first member and the second member are separately provided.

3. The clutch device according to claim 2, wherein the first member and the second member are fixed so as to be non-rotatable relatively to each other and be immovable relatively to each other in the axial direction.

4. The clutch device according to claim 1, wherein
the clutch center is disposed between the clutch housing and the pressure plate in the axial direction,
the clutch device further comprises a support member, the support member disposed in opposition to the clutch housing while the clutch center and the pressure plate are interposed between the support member and the clutch housing, the support member fixed to the clutch center,
the first cam portion is provided between the pressure plate and the support member, and
the second cam portion is provided between the pressure plate and the clutch center.

5. The clutch device according to claim 4, wherein
the first cam portion is configured to move the pressure plate in the axial direction such that the pressure applying part of the pressure plate approaches to the pressure receiving part of the clutch center when the pressure plate is rotated relatively to the clutch center in a first rotational direction, and
the second cam portion is configured to move the pressure plate in the axial direction such that the pressure applying part of the pressure plate separates from the pressure receiving part of the clutch center when the pressure plate is rotated relatively to the clutch center in a second rotational direction.

6. The clutch device according to claim 5, wherein
the support member is provided with a first protrusion, the first protrusion integrated with the support member, the first protrusion protruding toward the pressure plate, and
the first cam portion includes a first cam surface, the first cam surface provided on an end surface of the first protrusion in the circumferential direction, the first cam surface tilting with respect to the circumferential direction.

7. The clutch device according to claim 6, wherein the first cam portion includes a first slope, the first slope provided on the pressure plate, the first slope tilting in parallel to the first cam surface with respect to the circumferential direction, the first slope making contact with the first cam surface.

8. The clutch device according to claim 6, wherein
the clutch center is provided with a second protrusion, the second protrusion integrated with the clutch center, the second protrusion protruding toward the pressure plate, and
the second cam portion includes a second cam surface, the second cam surface provided on an end surface of the second protrusion in a circumferential direction, the second cam surface tilting with respect to the circumferential direction.

9. The clutch device according to claim 8, wherein the second cam portion includes a second slope, the second slope provided on the pressure plate, the second slope tilting in parallel to the second cam surface with respect to the circumferential direction, the second slope making contact with the second cam surface.

10. The clutch device according to claim 7, wherein
the first protrusion is exposed at an outer peripheral surface thereof through an outer peripheral surface of the first slope of the pressure plate to a further outer peripheral side than the outer peripheral surface of the first slope of the pressure plate,
the clutch center makes contact at an inner peripheral surface thereof with the outer peripheral surface of the first protrusion, and
the first protrusion protrudes toward the clutch center while making contact at the outer peripheral surface of the first protrusion with the inner peripheral surface of the clutch center so as to enable positioning of the support member in a radial direction.

\* \* \* \* \*